(12) United States Patent
Komaya et al.

(10) Patent No.: US 10,998,122 B2
(45) Date of Patent: May 4, 2021

(54) COMMON MODE FILTER AND MANUFACTURING METHOD THEREOF

(71) Applicant: TDK Corporation, Tokyo (JP)

(72) Inventors: Yuma Komaya, Tokyo (JP); Miki Kusakabe, Yamagata (JP); Tomokazu Tsuchiya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 122 days.

(21) Appl. No.: 15/876,482

(22) Filed: Jan. 22, 2018

(65) Prior Publication Data
US 2018/0211763 A1    Jul. 26, 2018

(30) Foreign Application Priority Data

Jan. 23, 2017 (JP) .............................. JP2017-009253

(51) Int. Cl.
| | |
|---|---|
| *H01F 27/28* | (2006.01) |
| *H02K 3/00* | (2006.01) |
| *H01F 27/29* | (2006.01) |
| *H01F 17/04* | (2006.01) |
| *H01F 17/00* | (2006.01) |
| *H01F 3/10* | (2006.01) |

(52) U.S. Cl.
CPC ......... *H01F 27/2823* (2013.01); *H01F 17/04* (2013.01); *H01F 17/045* (2013.01); *H01F 27/2828* (2013.01); *H01F 27/292* (2013.01); *H02K 3/00* (2013.01); *H01F 3/10* (2013.01); *H01F 2017/0093* (2013.01)

(58) Field of Classification Search
CPC .... H01F 27/2823; H01F 27/292; H01F 17/04; H01F 17/045; H01F 2017/0093
USPC .......... 336/83, 187, 188, 189, 192, 221, 222
See application file for complete search history.

(56) References Cited

U.S. PATENT DOCUMENTS

| | | | | |
|---|---|---|---|---|
| 2014/0167903 | A1* | 6/2014 | Tomonari | H01F 17/045 336/220 |
| 2015/0162126 | A1* | 6/2015 | Kanbe | H01F 19/04 336/192 |
| 2017/0294264 | A1* | 10/2017 | Hashimoto | H01F 27/2823 |
| 2017/0330676 | A1* | 11/2017 | Uchida | H01F 27/255 |
| 2018/0096782 | A1 | 4/2018 | Miyamoto et al. | |

FOREIGN PATENT DOCUMENTS

| | | |
|---|---|---|
| JP | 3016658 U | 10/1995 |
| JP | 2005-322820 A | 11/2005 |
| JP | 2005322820 A * | 11/2005 |
| JP | 2007036158 A * | 2/2007 |
| JP | 2010165953 A * | 7/2010 |
| JP | 2014-199904 A | 10/2014 |

* cited by examiner

*Primary Examiner* — Tszfung J Chan
(74) *Attorney, Agent, or Firm* — Young Law Firm, P.C.

(57) ABSTRACT

Disclosed herein is a common mode filter that includes a winding core part including a first winding area positioned at one end side in an axial direction, a second winding area positioned at other end side in the axial direction, and a third winding area positioned between the first and second winding areas; and first and second wires wound in a same direction around the winding core part. The first wire is aligned and wound in the first and second winding areas, and the second wire is wound on the first wire in the first and second winding areas. The first and second wires cross each other in the third winding area and are separated at least partially in the third winding area.

12 Claims, 17 Drawing Sheets

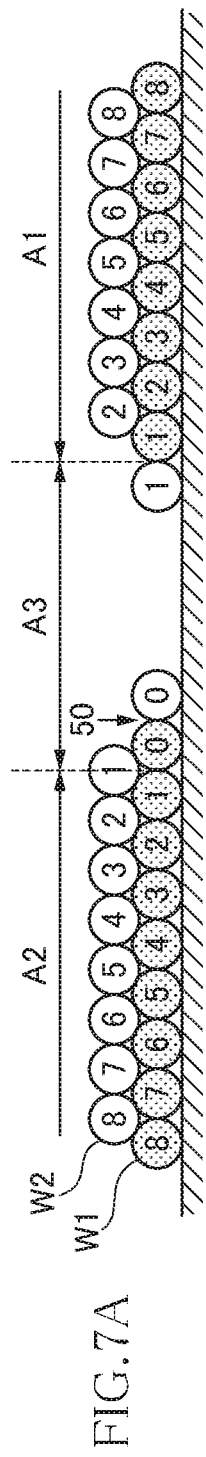
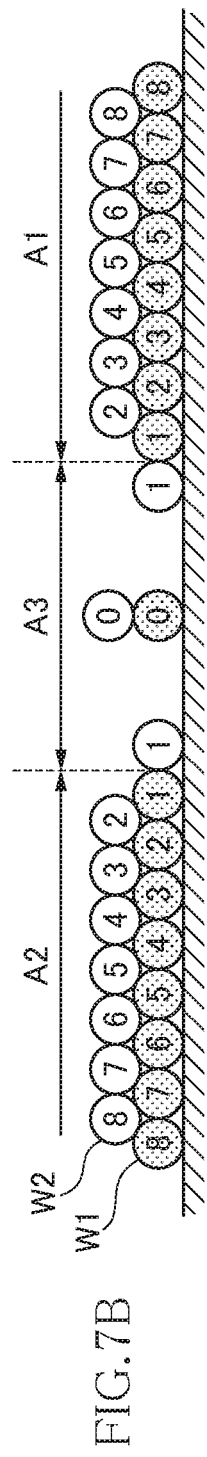
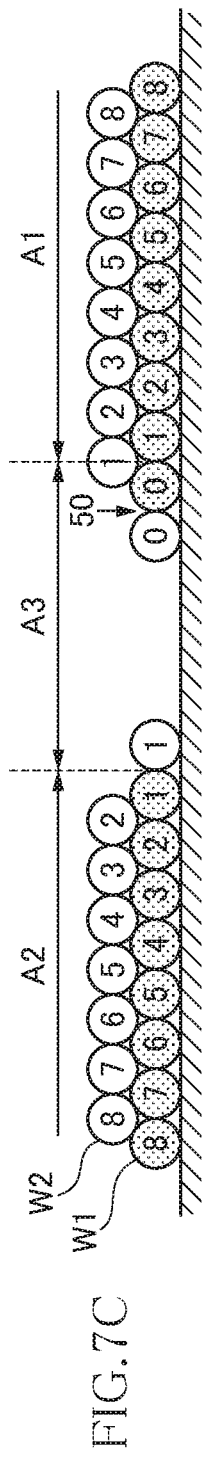
FIG.7A
FIG.7B
FIG.7C

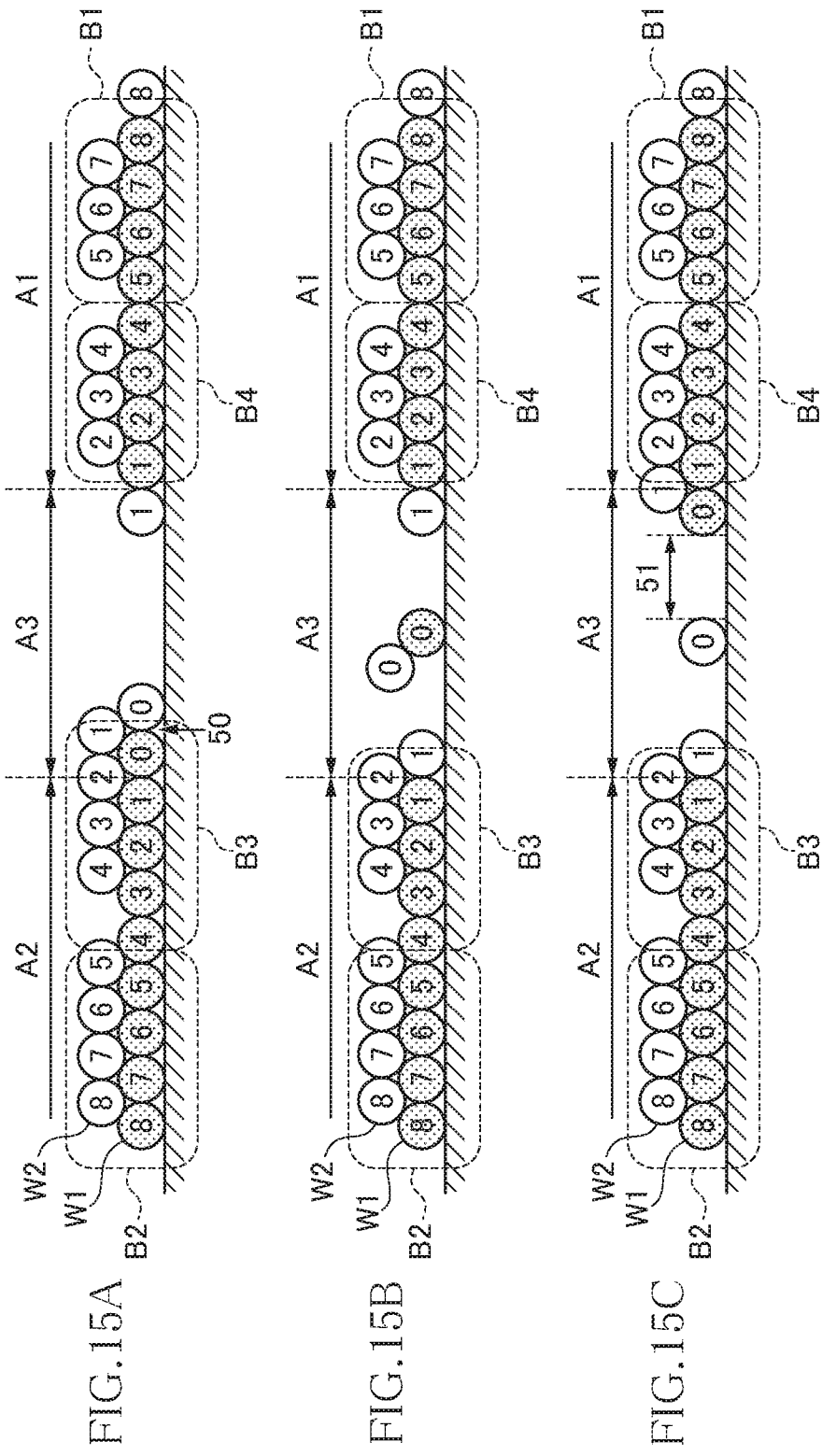

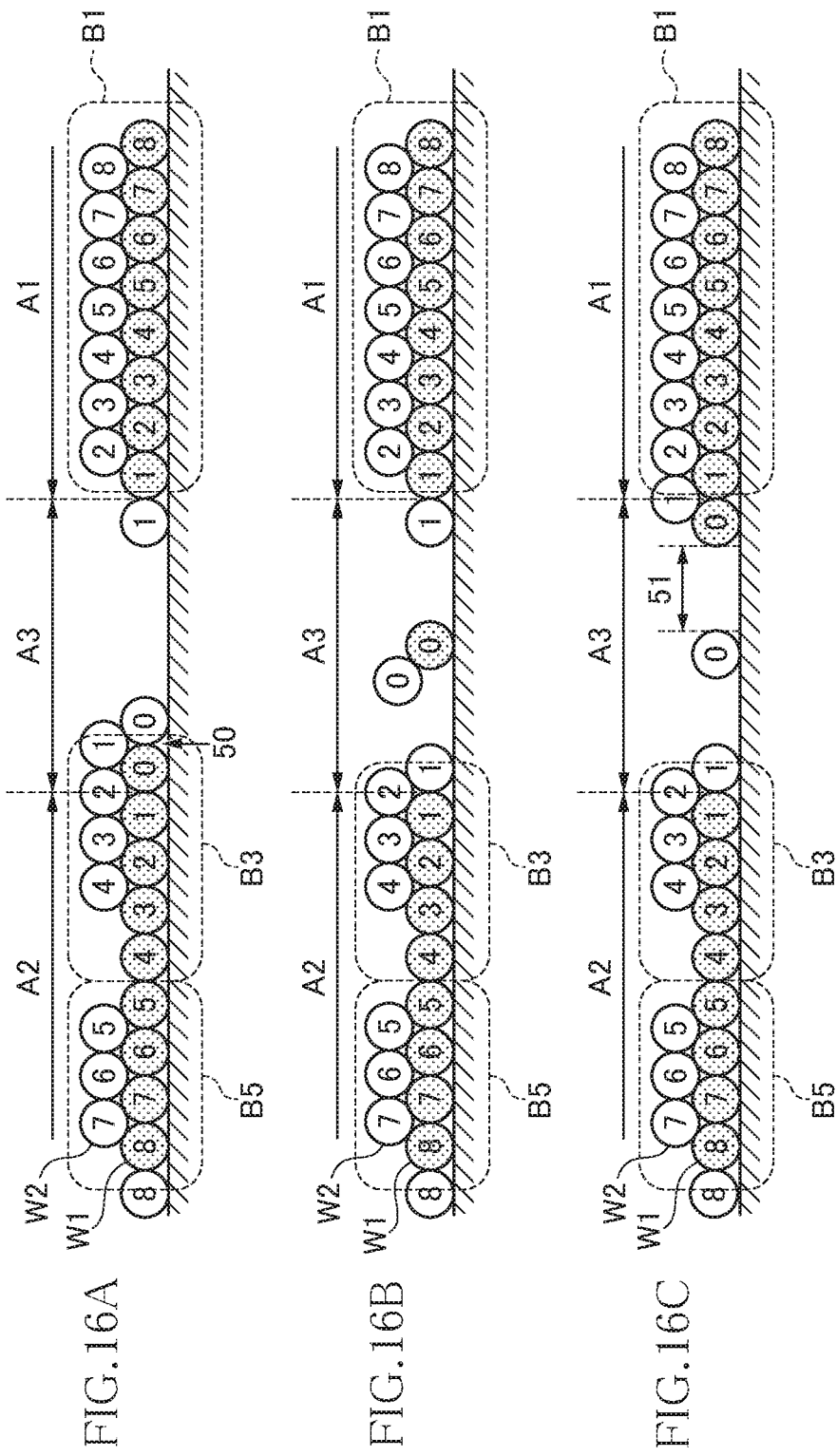

COMMON MODE FILTER AND MANUFACTURING METHOD THEREOF

BACKGROUND OF THE INVENTION

Field of the Invention

The present invention relates to a common mode filter and a manufacturing method thereof and, more particularly, to a common mode filter of a type in which a pair of wires cross each other on the way and a manufacturing method thereof.

Description of Related Art

A common mode filter is widely used in many electronic devices, such as mobile electronic devices and on-vehicle LANs, as an element for removing common mode noise superimposed on differential signal lines. In recent years, a common mode filter using a surface-mountable drum core supersedes a common mode filter using a toroidal core (see JP 2014-199904A).

In the common mode filter described in JP 2014-199904A, a pair of wires are made to cross each other on the way to thereby enhance symmetry between differential signals in a high-frequency region.

However, when a pair of wires are made to cross each other, the winding position of the upper-side wire becomes unstable at the crossing point, which may cause variations in high-frequency characteristics.

SUMMARY

It is therefore an object of the present invention to provide a common mode filter in which the winding position of the wire at the crossing point is stabilized and a manufacturing method thereof.

A common mode filter according to the present invention includes a winding core part and first and second wires wound in the same direction around the winding core part. The winding core part includes a first winding area positioned at one end side in the axial direction, a second winding area positioned at the other end side in the axial direction, and a third winding area positioned between the first and second winding areas. The first wire is aligned and wound in the first and second winding areas, and the second wire is wound on the first wire in the first and second winding areas. The first and second wires cross each other in the third winding area and are separated at least partially in the third winding area.

According to the present invention, the two wires are separated from each other in the third winding area where the two wires cross each other, so that a sufficient crossing angle can be ensured. This reduces a contact distance between the two wires at the crossing point, thereby achieving increased stability in the winding position of the upper-side second wire.

In the present invention, it is preferable that the third winding area has first and second edges extending in the axial direction and a surface area sandwiched between the first and second edges, that the first wire includes a first section positioned on the surface area, that the second wire includes a second section positioned on the surface area, and that the first section of the first wire and the second section of the second wire cross each other on the surface area and are separated from each other at least on one of the first and second edges. With the above configuration, the first and second wires are held by the first or second edge at a part where they are separated from each other, allowing increased stability in the winding position of the wire to be obtained.

In this case, it is preferable that the first section of the first wire and the second section of the second wire are separated from each other on the first edge and contact each other on the second edge. This configuration is particularly effective when the second wire is wound from the first edge side toward the second edge side.

Further, in this case, it is preferable that the third winding area has a third edge extending in the axial direction, and that a distance between the first and third edges is substantially a same as a distance between the second and third edges. With this configuration, adhesion between the wire and the winding core part can be enhanced. In this case, it is more preferable that the surface area includes a first surface area positioned between the first and third edges and a second surface area positioned between the second and third edges and that the first section of the first wire and the second section of the second wire cross each other on the second surface area. With this configuration, the wires cross each other at a position shifted from the edge, allowing increased stability in the winding position of the wire to be obtained.

It is preferable that the common mode filter according to the present invention further includes a first flange part provided at the one end of the winding core part in the axial direction and having a mounting surface and a top surface which extend in parallel to the axial direction and a second flange part provided at the other end of the winding core part in the axial direction and having a mounting surface and a top surface which extend in parallel to the axial direction, first and second terminal electrodes provided on the mounting surface of the first flange part and connected with one ends of the respective first and second wires, and third and fourth terminal electrodes provided on the mounting surface of the second flange part and connected with the other ends of the respective first and second wires, that the surface area faces in the same direction as the mounting surface, and that the winding core part is formed at a position closer to the top surface side than to the mounting surface side. With this configuration, it is possible to prevent interference between the second wire and the mounting substrate at the crossing point.

In the present invention, it is preferable that the first and second wires constitute a first winding block in which the same turns thereof are mutually adjacent in the first winding area. With this configuration, symmetry between the first and second wires is enhanced in the first winding block, allowing excellent high-frequency characteristics to be obtained.

In this case, it is preferable that the first and second wires constitute a second winding block in which the same turns thereof are mutually adjacent in the second winding area. With this configuration, symmetry between the first and second wires is enhanced also in the second winding block, allowing excellent high-frequency characteristics to be obtained.

In this case, the first and second wires may further constitute a third winding block in which the same turns thereof are positioned with different turns thereof interposed therebetween in the second winding area. With this configuration, high-frequency characteristics changing depending on the mounting direction can be obtained. The third winding block may be positioned between the first and second winding blocks.

As described above, according to the present invention, there can be provided a common mode filter in which stability in the winding position of the wire at the crossing point is enhanced and a manufacturing method therefor.

BRIEF DESCRIPTION OF THE DRAWINGS

The above and other objects, features and advantages of this invention will become more apparent by reference to the following detailed description of the invention taken in conjunction with the accompanying drawings, wherein:

FIG. 7A is a schematic cross-sectional view taken along line A-A (second edge E2) shown in FIG. 6;

FIG. 7B is a schematic cross-sectional view taken along line B-B shown in FIG. 6;

FIG. 7C is a schematic cross-sectional view taken along line C-C (first edge E1) shown in FIG. 6;

FIGS. 15A to 15C are views for explaining a third modification;

FIGS. 16A to 16C are views for explaining a fourth modification; and

DETAILED DESCRIPTION OF THE EMBODIMENTS

Preferred embodiments of the present invention will now be explained in detail with reference to the drawings.

First Embodiment

Figure 1:
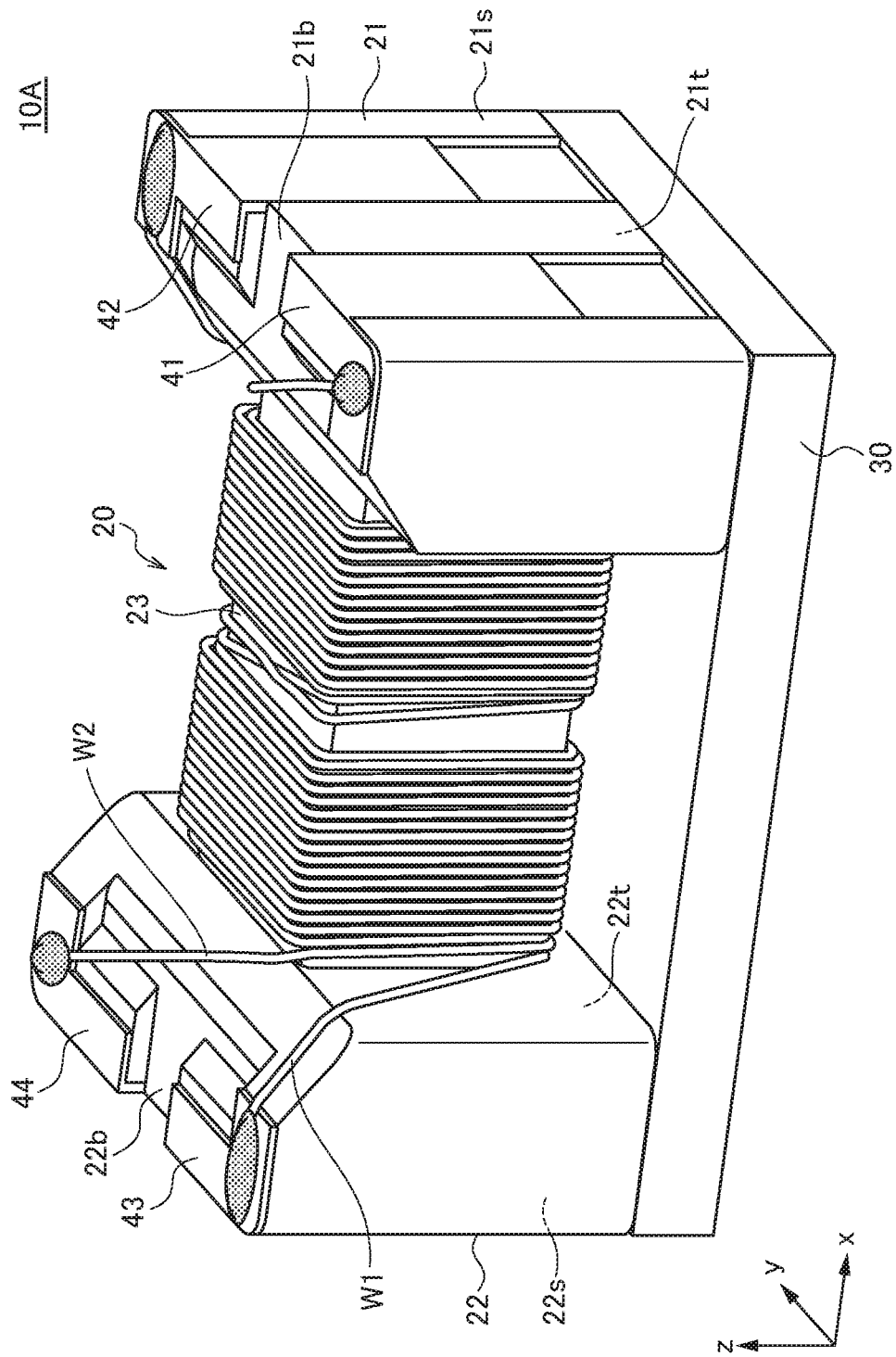
FIG. 1 is a schematic perspective view illustrating the outer appearance of a common mode filter according to a first embodiment of the present invention.

FIG. 1 is a schematic perspective view illustrating the outer appearance of a common mode filter 10A according to the first embodiment of the present invention.

As illustrated in FIG. 1, the common mode filter 10A according to the present embodiment has a drum-shaped core 20, a plate-like core 30, first to fourth terminal electrodes 41 to 44, and first and second wires W1 and W2. The drum-shaped core 20 and the plate-like core 30 are each formed of a magnetic material having a comparatively high permeability, such as an Ni—Zn based ferrite. The first to fourth terminal electrodes 41 to 44 are each a metal fitting formed of a good conductor material such as copper.

The drum-shaped core 20 has a first flange part 21, a second flange part 22, and a winding core part 23 disposed between the first and second flange parts 21 and 22. The winding core part 23 has its axis direction in the x-direction. The first and second flange parts 21 and 22 are disposed at the axially both ends of the winding core part 23 and integrally formed with the winding core part 23. The plate-like core 30 is bonded to top surfaces 21t and 22t of the respective flange parts 21 and 22. The top surfaces 21t and 22t of the respective flange parts 21 and 22 each constitute the xy plane, and the surfaces opposite to the top surfaces 21t and 22t are used as mounting surfaces 21b and 22b. The first and second terminal electrodes 41 and 42 are mounted on the mounting surface 21b and an outer surface 21s of the first flange part 21, and the third and second terminal electrodes 43 and 44 are mounted on the mounting surface 22b and an outer surface 22s of the second flange part 22. The outer surfaces 21s and 22s each constitute the yz surface. Fixing of the first to fourth terminal electrodes 41 to 44 is made by using an adhesive or the like.

The first and second wires W1 and W2 are wound around the winding core part 23 in the same direction. One and the other ends of the first wire W1 are connected respectively to the first and third terminal electrodes 41 and 43, and one and the other ends of the second wire W2 are connected respectively to the second and fourth terminal electrodes 42 and 44. The numbers of turns of the first and second wires W1 and W2 are the same.

Figure 2:
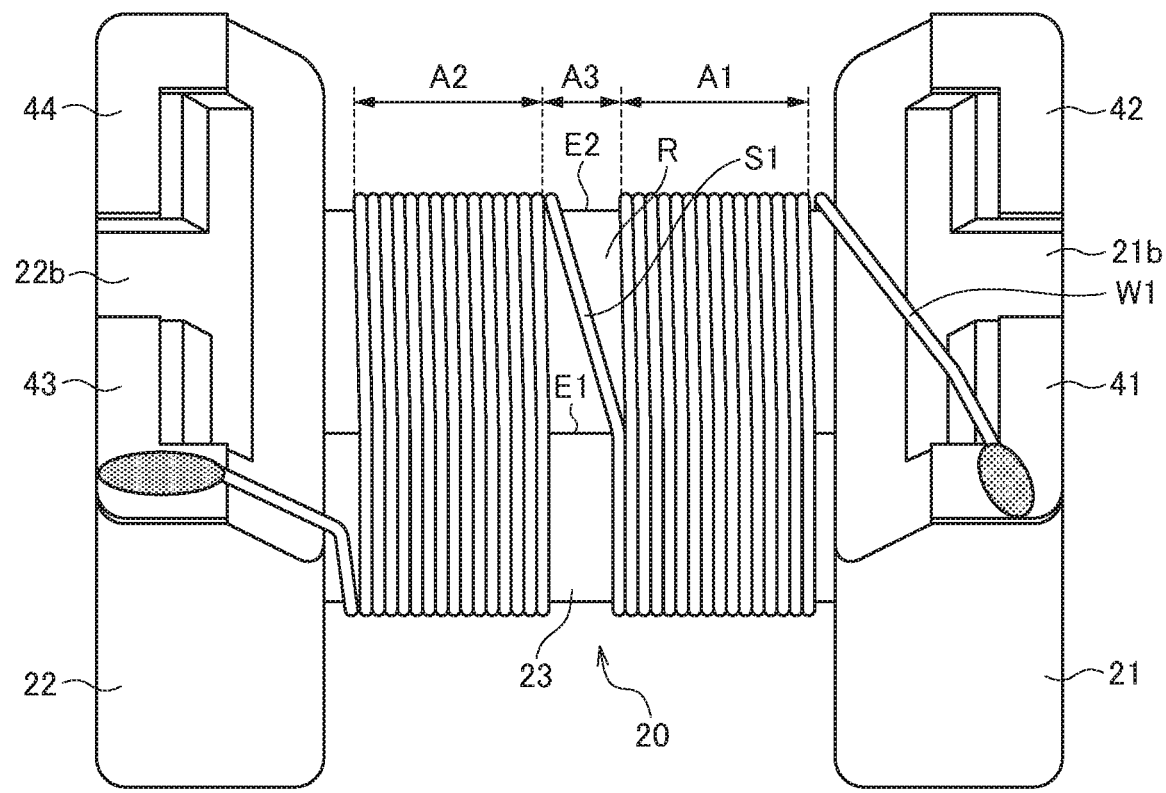
FIG. 2 is a view for explaining the winding layout of a first wire.

FIG. 2 is a view for explaining the winding layout of the first wire W1.

As illustrated in FIG. 2, the winding core part 23 of the drum-shaped core 20 includes a first winding area A1 positioned on the first flange part 21 side, a second winding area A2 positioned on the second flange part 22 side, and a third winding area A3 positioned between the first and second winding areas A1 and A2. The first wire W1 is aligned and wound in the first and second winding areas A1 and A2. Thus, the winding pitch of the first wire W1 in the first and second winding areas A1 and A2 is nearly equal to the diameter of the first wire W1 and, ideally, adjacent turns of the first wire W1 contact each other. Although not particularly limited, the number of turns of the first wire W1 in the first winding area A1 and the number of turns of the first wire W1 in the second winding area A2 are preferably the same.

In the third winding area A3, the amount of shift of the first wire W1 in the axial direction (x-direction) is large, so that an angle formed by the extending direction of the first wire W1 and the y-direction is larger in the third winding area A3 than that in the first and second winding areas A1 and A2. In the present embodiment, the first wire is significantly shifted on a surface area R of the third winding area A3. The surface area R refers to a surface belonging to the third winding area A3 and sandwiched between first and second edges E1 and E2 of the winding core part 23. In the present embodiment, the surface area R constitutes the xy plane. The first and second edges E1 and E2 are each a corner part extending in the x-direction. As illustrated in FIG. 2, a part of the first wire W1 positioned on the surface area R constitutes a first section S1. Although not particularly limited, the surface area R preferably faces in the same direction as that the mounting surfaces 21b and 22b face.

Figure 3:
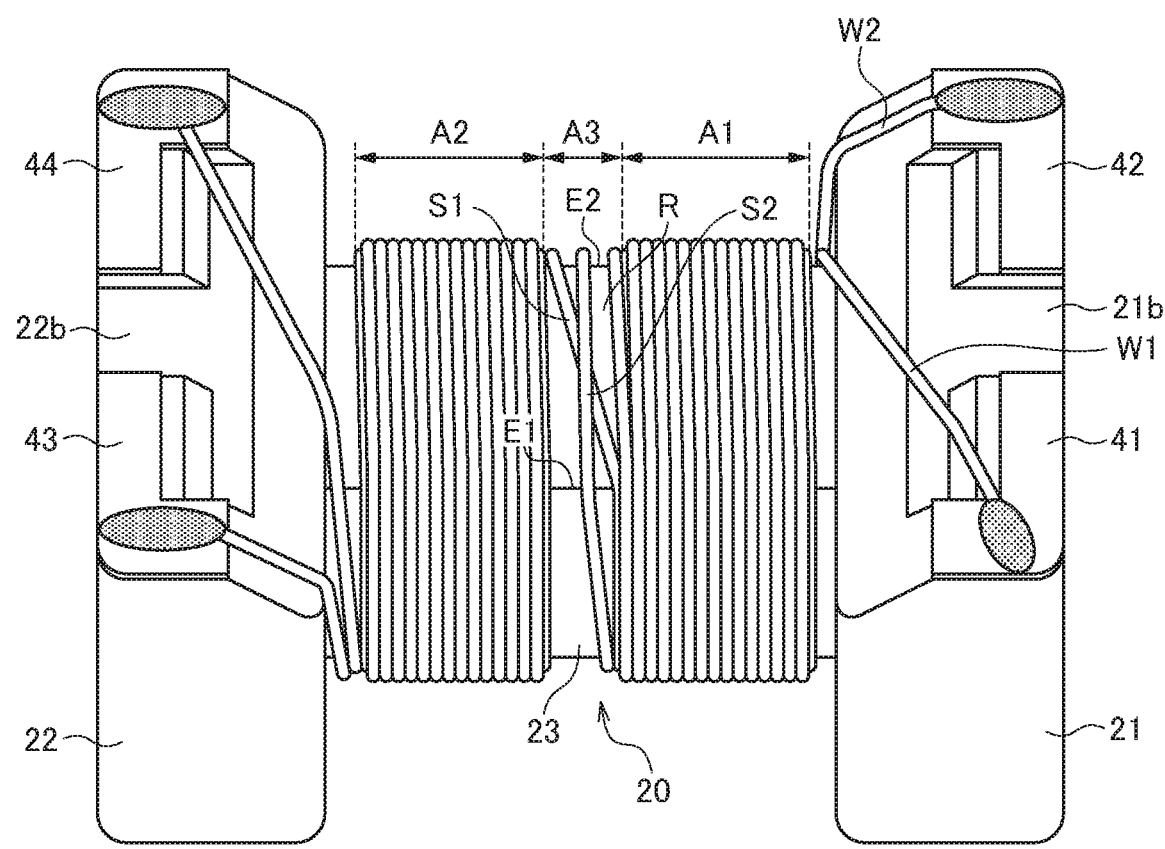
FIG. 3 is a view for explaining the winding layout of a second wire.

FIG. 3 is a view for explaining the winding layout of the second wire W2.

As illustrated in FIG. 3, the second wire W2 is wound on the first wire W1 in the first and second winding areas A1 and A2. Preferably, the second wire W2 is wound along the valley lines each formed by adjacent turns of the first wire W1. Thus, the winding pitch of the second wire W2 in the first and second winding areas A1 and A2 is nearly equal to the diameter of the second wire W2 and, ideally, adjacent turns of the second wire W2 contact each other. Although not particularly limited, the number of turns of the second wire W2 in the first winding area A1 and the number of turns of the second wire W2 in the second winding area A2 are preferably the same.

In the third winding area A3, the second wire W2 crosses the first wire W1 so as to straddle the same. More specifically, assuming that a part of the second wire W2 positioned on the surface area R is a second section S2, the first section S1 and the second section S2 cross each other on the surface area R. However, an angle formed by the extending direction of the second section S2 and the y-direction is smaller than an angle formed by the extending direction of the first section S1 and the y-direction.

Figure 4:
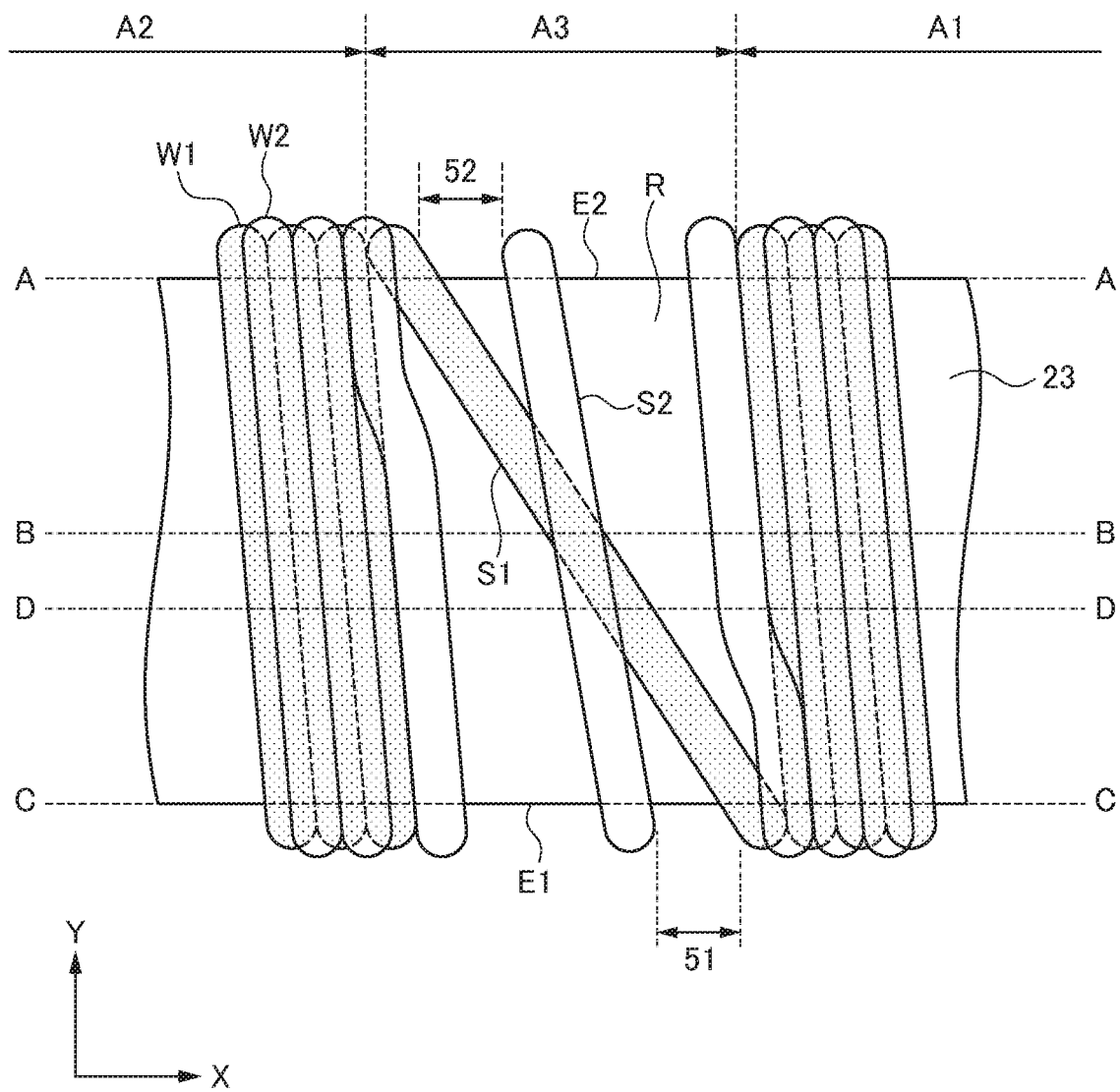
FIG. 4 is a schematic view for explaining more in detail the winding layouts of the first and second wires in the first embodiment.
Figure 5A:
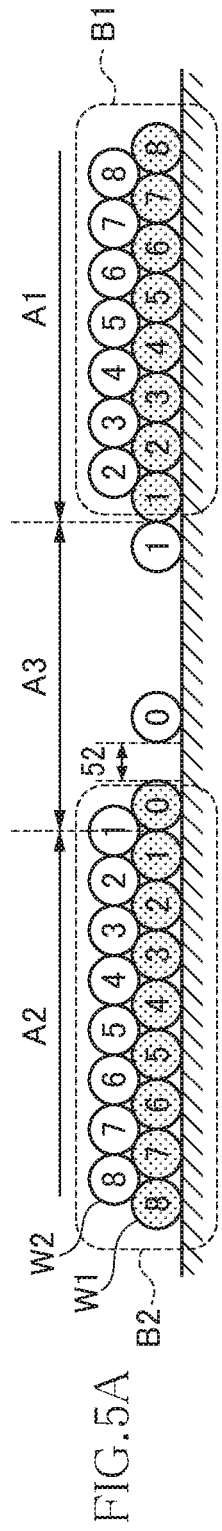
FIG. 5A is a schematic cross-sectional view taken along line A-A (second edge E2) shown in FIG. 4.
Figure 5B:
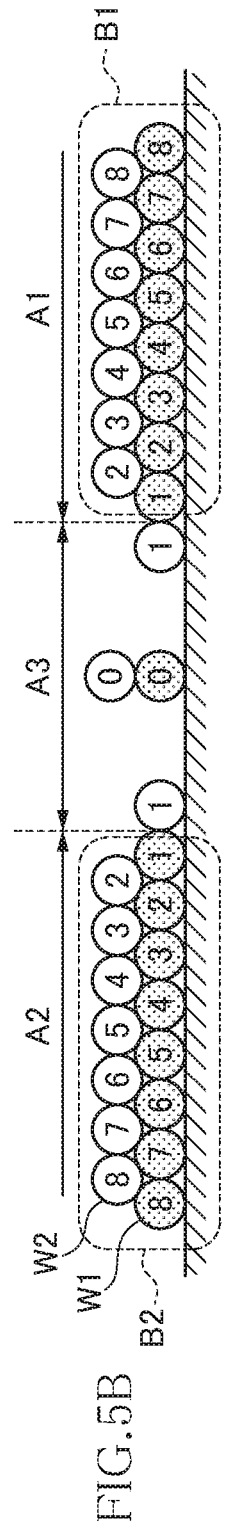
FIG. 5B is a schematic cross-sectional view taken along line B-B shown in FIG. 4.
Figure 5C:
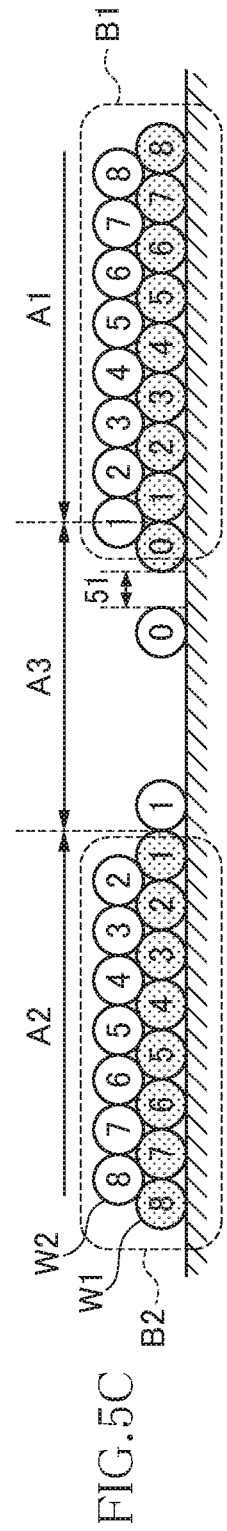
FIG. 5C is a schematic cross-sectional view taken along line C-C (first edge E1) shown in FIG. 4.
Figure 5D:
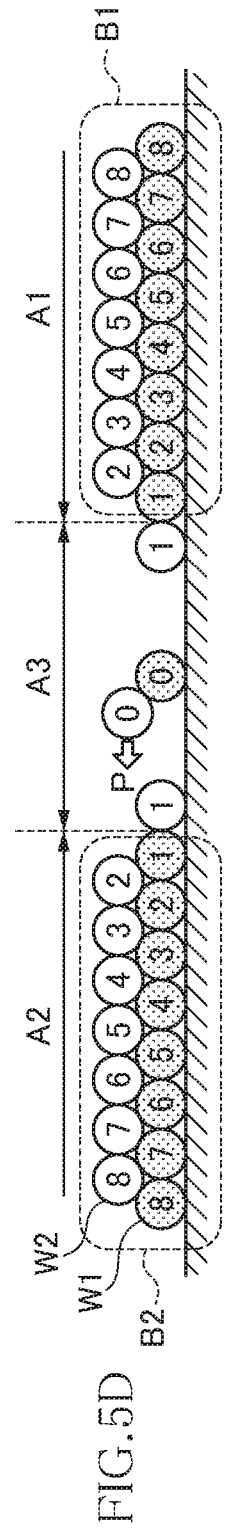
FIG. 5D is a schematic cross-sectional view taken along line D-D shown in FIG. 4.

FIG. 4 is a schematic view for explaining more in detail the winding layouts of the first and second wires W1 and W2. FIG. 5A is a schematic cross-sectional view taken along line A-A (second edge E2) shown in FIG. 4, FIG. 5B is a schematic cross-sectional view taken along line B-B shown in FIG. 4, FIG. 5C is a schematic cross-sectional view taken along line C-C (first edge E1) shown in FIG. 4, and FIG. 5D is a schematic cross-sectional view taken along line D-D shown in FIG. 4.

As illustrated in FIG. 4, the angle formed by the extending direction of the second section S2 and the y-direction is sufficiently smaller than the angle formed by the extending direction of the first section S1 and the y-direction, with the result that the first and second wires W1 and W2 are separated from each other near the crossing point. In the present embodiment, the first and second wires W1 and W2 are separated from each other on the first and second edges E1 and E2 as denoted by double headed arrows 51 and 52, respectively.

As a result, a contact distance between the first and second wires W1 and W2 at the crossing point is reduced, so that the winding position of the second wire W2 positioned above the first wire W1 is stabilized. That is, the second wire W2 is positioned right over the first wire W1 at the center of the crossing point (see FIG. 5B), so that a force to displace the second wire W2 in the x-direction does not act; however, the second wire W2 is positioned on the inclined face of the first wire W1 (see FIG. 5D) at a portion slightly separated from the center of the crossing point in the y-direction, so that force P to displace the second wire W2 in the x-direction acts. The force P becomes stronger as the contact distance between the first and second sections S1 and S2 at the crossing point is longer (as the angle formed by the first and second sections S1 and S2 is smaller). In the present embodiment, the first and second sections S1 and S2 are separated from each other on the first and second edges E1 and E2, so that the contact distance therebetween is small to reduce the force P. This suppresses displacement of the second wire W2 near the crossing point.

Figure 6:
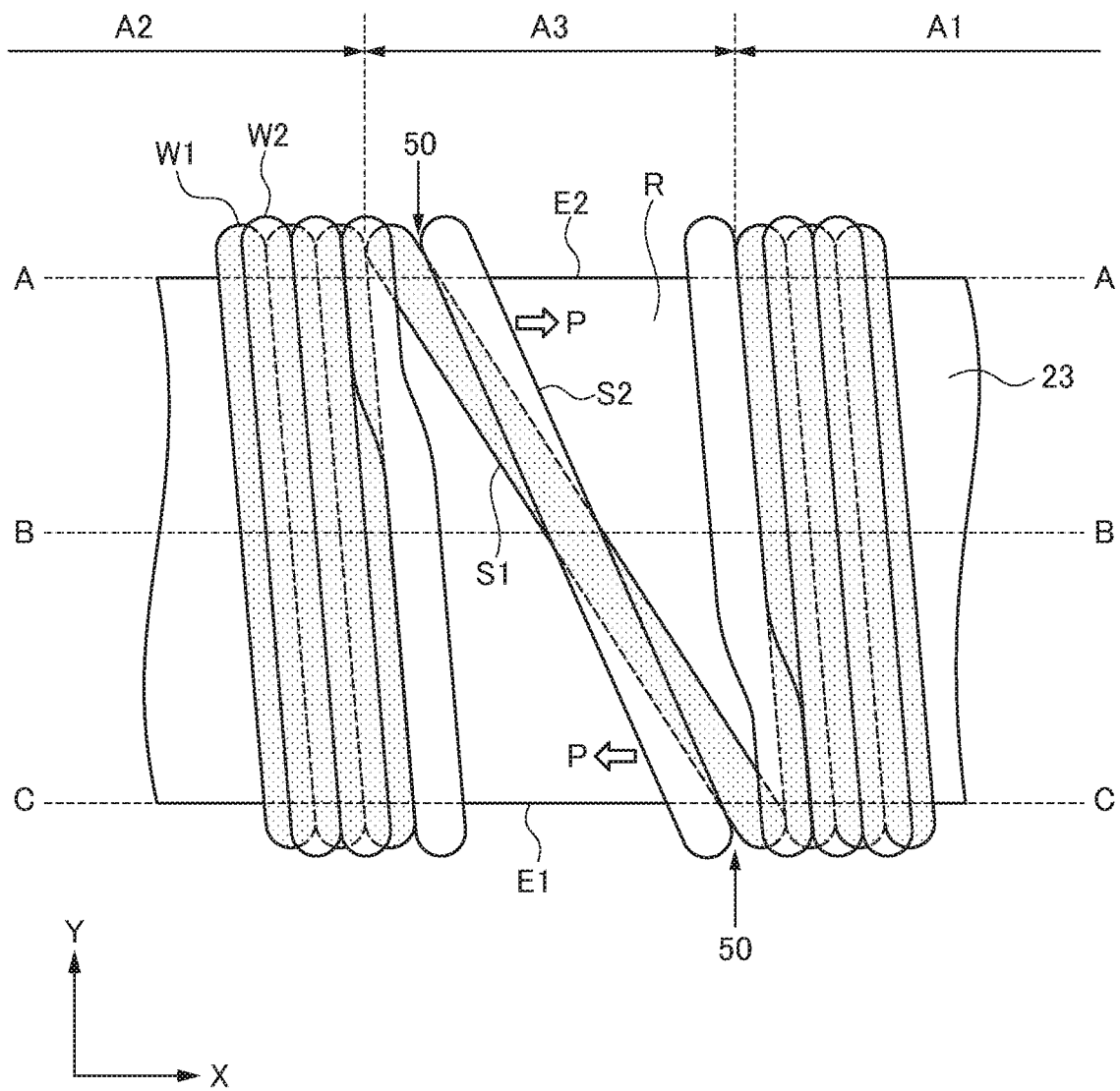
FIG. 6 is a schematic view for explaining in detail the winding layouts of the first and second wires in a comparative example.

FIG. 6 is a schematic view for explaining in detail the winding layouts of the first and second wires W1 and W2 in a comparative example. FIG. 7A is a schematic cross-sectional view taken along line A-A (second edge E2) shown in FIG. 6, FIG. 7B is a schematic cross-sectional view taken along line B-B shown in FIG. 6, and FIG. 7C is a schematic cross-sectional view taken along line C-C (first edge E1) shown in FIG. 6.

In the comparative example illustrated in FIG. 6, as denoted by arrows 50, the first and second wires W1 and W2 contact each other on both the first and second edges E1 and E2. Thus, as compared to the embodiment illustrated in FIG. 4, an angle formed by the first and second sections S1 and S2 is reduced, and the contact distance between the first and second sections S1 and S2 on the surface area R is increased. As a result, a part of the second section S2 positioned on the inclined face of the first section S1 becomes long, so that the force P to displace the second wire W2 in the x-direction strongly acts, which may cause the winding position of the second wire W2 to be displaced in the X-direction during or after winding work.

On the other hand, in the present embodiment, a winding structure in which the second wire W2 is hardly displaced is adopted, thereby allowing increased stability in the winding position of the second wire W2 to be obtained. Further, the second wire W2 is more difficult in terms of position control during winding work than the first wire W1. Particularly, the larger the shift amount per unit wire length in the x-direction, the larger the displacement to be caused during winding work is likely to be. However, in the present embodiment, the shift amount of the second wire W2 per unit wire length in the x-direction is reduced in the third winding area A3. Thus, also in this respect, the displacement of the winding position can be reduced. As a result, according to the present embodiment, a common mode filter having less variations in characteristics can be provided.

In FIGS. 5A to 5D, numbers are added to the respective turns of the first and second wires W1 and W2. In FIGS. 5A to 5D, the turn number around the portion at which the first and second wires W1 and W2 cross each other is defined as "0". As illustrated in FIGS. 5A to 5D, in the first winding area A1, a first winding block B1 in which wires with the same turn numbers counted from the crossing point are mutually adjacent is formed. Similarly, in the second winding area A2, a second winding block B2 in which wires with the same turn numbers counted from the crossing point are mutually adjacent is formed. When the wires with the same turn numbers counted from the crossing point are made mutually adjacent, symmetry between the first and second wires W1 and W2 with respect to the crossing point is enhanced, allowing excellent high-frequency characteristics to be obtained. In the present embodiment, the first and second winding blocks B1 and B2 are formed on the both surfaces of the crossing point, respectively, so that high-frequency characteristics can be further enhanced.

Figure 8:
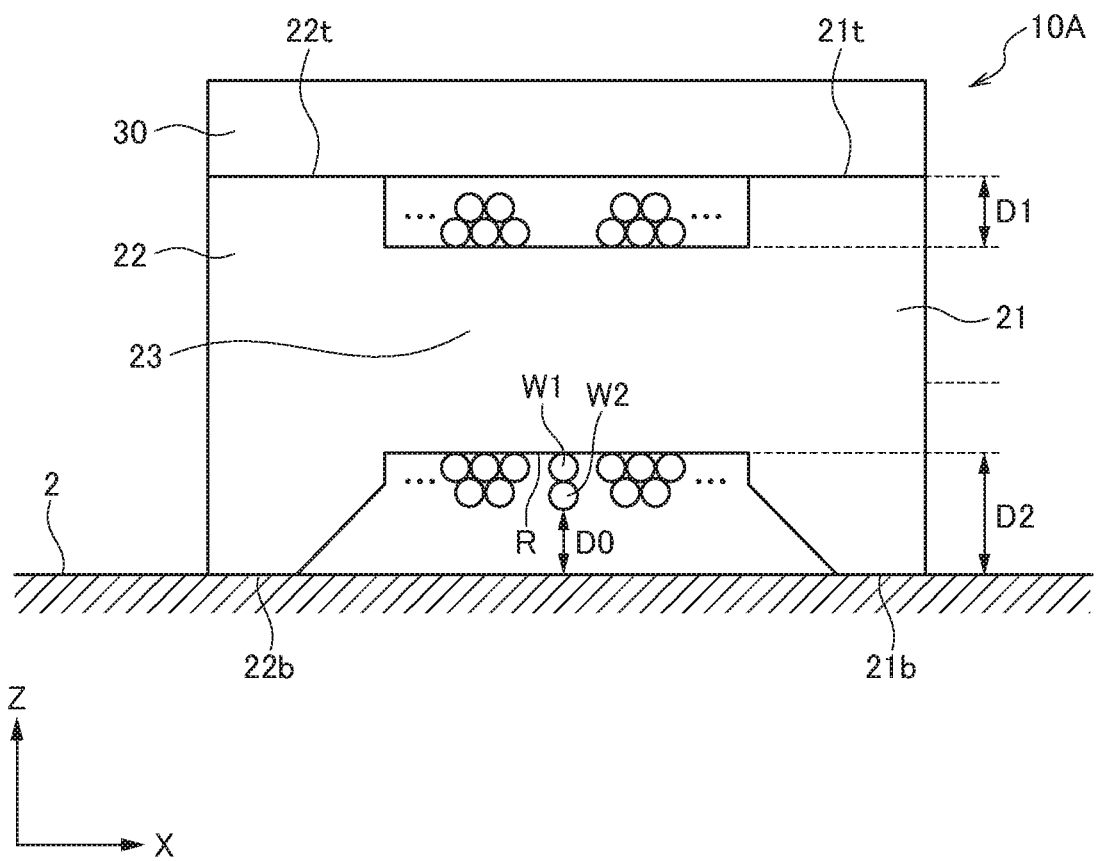
FIG. 8 is a schematic xz cross-sectional view illustrating a state where the common mode filter according to the first embodiment is mounted on a mounting substrate.

FIG. 8 is a schematic xz cross-sectional view illustrating a state where the common mode filter 10A according to the present embodiment is mounted on a mounting substrate 2.

As illustrated in FIG. 8, in a state where the common mode filter 10A according to the present embodiment is mounted on the mounting substrate 2, the surface area R and the mounting substrate 2 face each other. As described above, the first and second wires W1 and W2 cross each other on the surface area R, so that the protruding amount (height in the z-direction) of the second wire W2 on the surface area R is larger than in the first and second winding areas A1 and A2. This is because the second wire W2 is wound along the valley lines of the first wire W1 in the first and second winding areas A1 and A2, while the second wire W2 is positioned right over the first wire W1 in the third winding area A3 (see FIG. 5B). Accordingly, a distance D0 between the second wire W2 and the mounting substrate 2 is reduced in the third winding area A3, which may cause interference therebetween.

To prevent such interference, in the present embodiment, the winding core part 23 is formed at a position closer in the z-direction to the top surfaces 21$t$ and 22$t$ than to the mounting surfaces 21$b$ and 22$b$. That is, by satisfying the following relationship:

$$D1<D2$$

where a distance between the winding core part 23 and the top surfaces 21$t$ and 22$t$ in the z-direction is D1, and a distance between the winding core part 23 and the mounting surfaces 21$b$ and 22$b$ in the z-direction is D2, it is possible to increase the distance D0 between the second wire W2 and the mounting substrate 2 without involving an increase in the height of the common mode filter 10A, allowing prevention of interference between the substrate 2 and the second wire W2.

Second Embodiment

Figure 9:
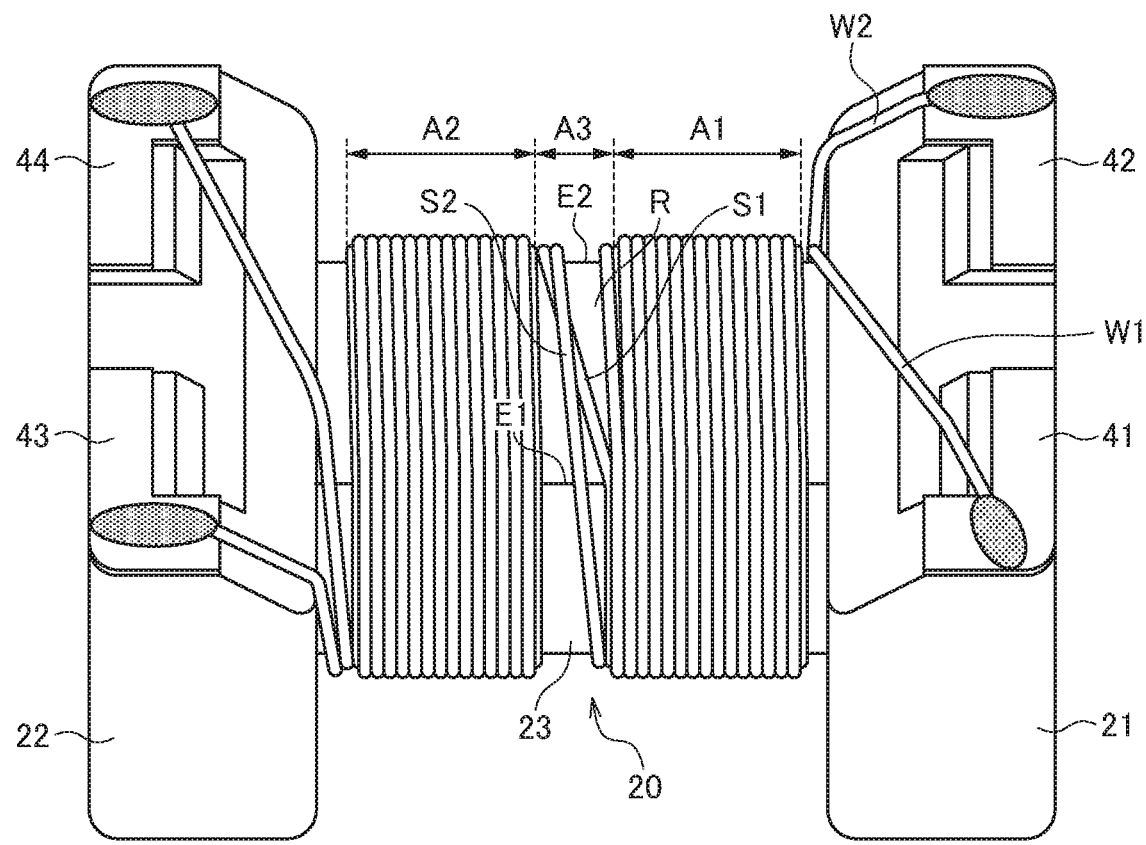
FIG. 9 is a schematic perspective view illustrating the outer appearance of a common mode filter according to a second embodiment of the present invention.

FIG. 9 is a schematic perspective view illustrating the outer appearance of a common mode filter 10B according to the second embodiment of the present invention.

As illustrated in FIG. 9, the common mode filter 10B according to the present embodiment differs from the common mode filter 10A according to the first embodiment in the layout of the second wire W2. Other configurations are the same as those of the common mode filter 10A according to the first embodiment, so the same reference numerals are given to the same elements, and overlapping description will be omitted.

Figure 10:
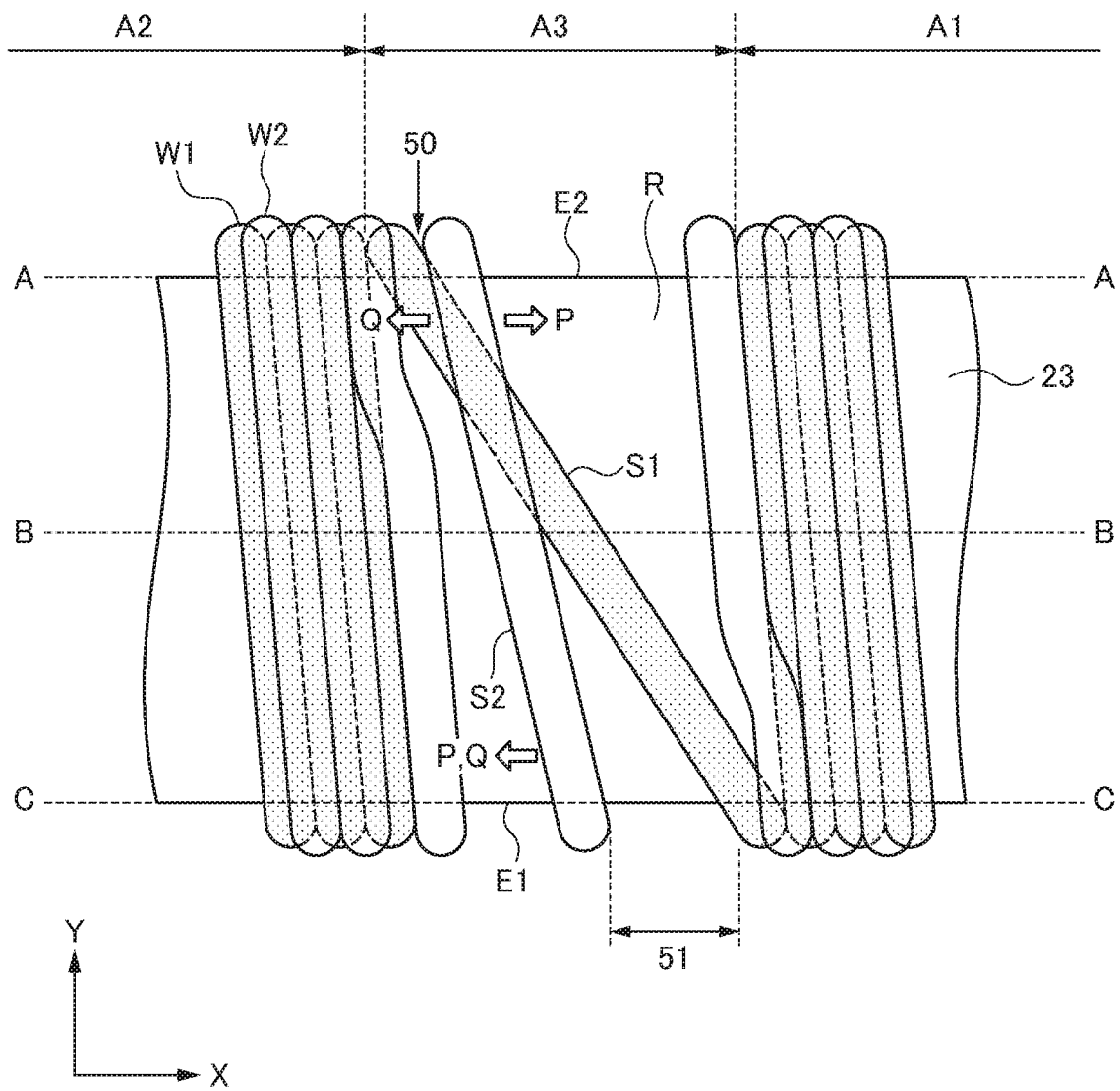
FIG. 10 is a schematic view for explaining more in detail the winding layout of the first and second wires in the second embodiment.
Figure 11A:
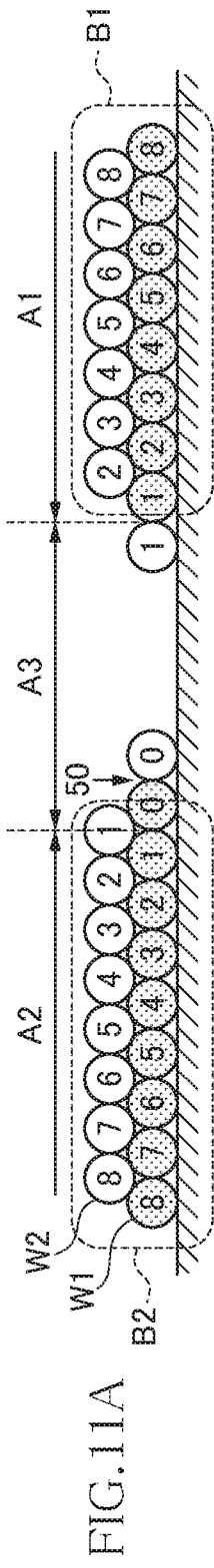
FIG. 11A is a schematic cross-sectional view taken along line A-A (second edge E2) shown in FIG. 10.
Figure 11B:
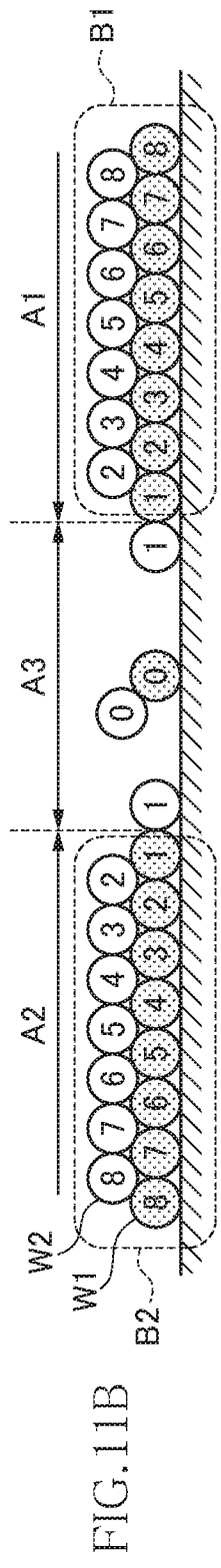
FIG. 11B is a schematic cross-sectional view taken along line B-B shown in FIG. 10.
Figure 11C:
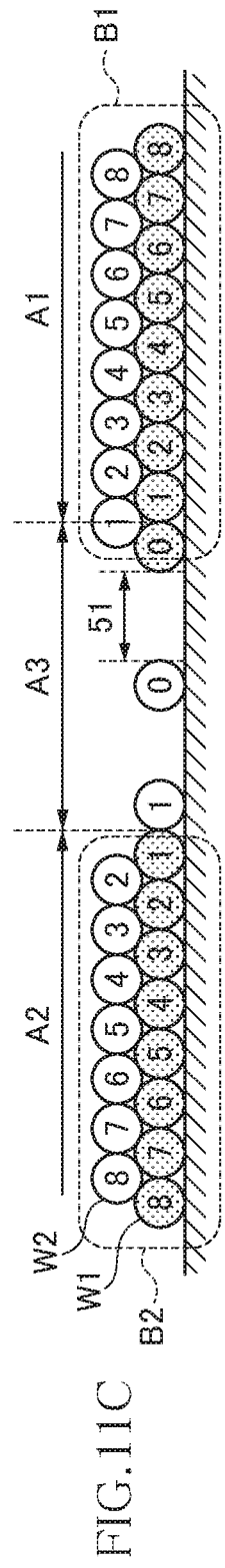
FIG. 11C is a schematic cross-sectional view taken along line C-C (first edge E1) shown in FIG. 10.

FIG. 10 is a schematic view for explaining more in detail the winding layout of the first and second wires W1 and W2. FIG. 11A is a schematic cross-sectional view taken along line A-A (second edge E2) shown in FIG. 10, FIG. 11B is a schematic cross-sectional view taken along line B-B shown in FIG. 10, and FIG. 11C is a schematic cross-sectional view taken along line C-C (first edge E1) shown in FIG. 10. Numbers are added to the respective turns of the first and second wires W1 and W2 in FIGS. 11A to 11C (and the following figures).

In the present embodiment, as denoted by the double headed arrow 51, in the third winding area A3, the first and second wires W1 and W2 are separated from each other on the first edge E1 and, as denoted by the arrow 50, the first and second wires W1 and W2 contact each other on the second edge E2. Accordingly, the separation distance between the first and second wires W1 and W2 on the first edge E1 is larger than that in the first embodiment, and the second wire W2 on the first edge E1 is positioned at substantially the x-direction center in the third winding area A3.

The winding layout according to the present embodiment is particularly effective when the second wire W2 is wound from the first edge E1 side toward the second edge E2 side. The reason for this is as follows.

When the second wire W2 is wound from the first edge E1 side to the second edge E2 side, a force (force in the shift direction) denoted by blanked arrow Q is always applied to the second wire W2 during winding work. On the other hand, force P to displace the second wire W2 near the crossing point is applied in the same direction as the force Q on the first edge E1 side and in the direction opposite to the force Q on the second edge E2 side. That is, the force P and force Q cancel each other on the second edge E2 side. On the other hand, the force P and the force Q are added to each other on the first edge E1 side, so that the second wire W2 is displaced more easily on the first edge E1 side.

However, in the present embodiment, the crossing point between the first and second wires W1 and W2 is offset to the second edge E2 side, so that the force P on the first edge E1 side is significantly reduced, making the displacement of second wire W2 on the first edge E1 side less likely to occur. On the other hand, on the second edge E2 side, the force P and the force Q cancel each other as described above, and a distance between the crossing point and the second edge E2 is small, so that the position of the second wire W2 is held by the second edge E2. By such a mechanism, the second wire W2 can be effectively prevented from being displaced.

As described above, in the present embodiment, the winding layout taking the winding direction of the second wire W2 into consideration is adopted, allowing increased stability in the second wire W2 to be obtained.

Third Embodiment

Figure 12:
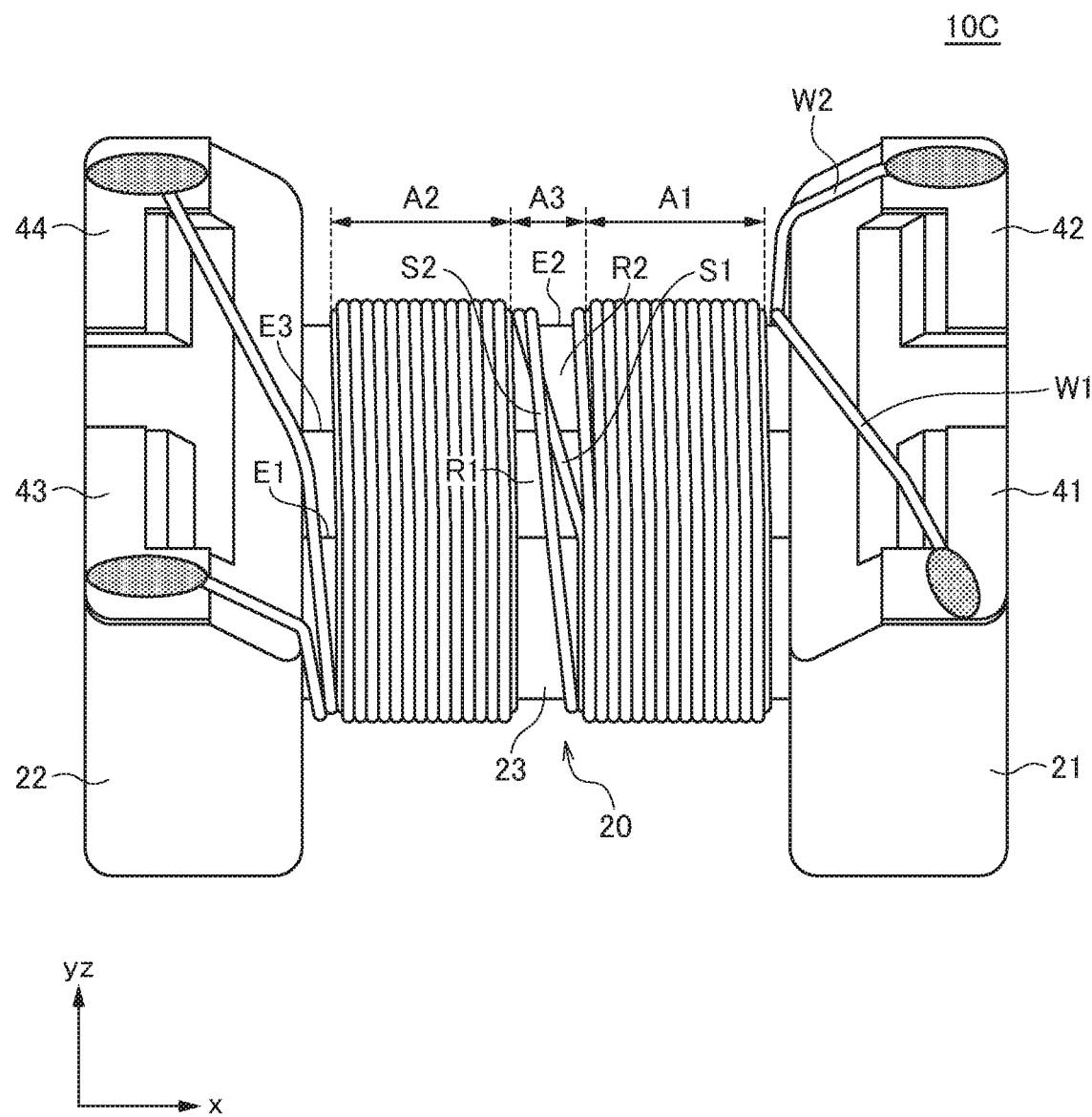
FIG. 12 is a schematic perspective view illustrating the outer appearance of a common mode filter according to the third embodiment of the present invention.

FIG. 12 is a schematic perspective view illustrating the outer appearance of a common mode filter 10C according to the third embodiment of the present invention.

As illustrated in FIG. 12, the common mode filter 10C according to the present embodiment differs from the common mode filter 10B according to the second embodiment in that the yz cross section of the winding core part 23 has a hexagonal shape and, thus, a third edge E3 exists between the first and second edges E1 and E2. Other configurations of the common mode filter 10C are the same as those of the common mode filter 10B according to the second embodiment, so the same reference numerals are given to the same elements, and overlapping description will be omitted.

The third edge E3 exists at substantially an intermediate position between the first and second edges E1 and E2. That is, a distance between the third edge E3 and the first edge E1 in the y-direction is substantially equal to a distance between the third edge E3 and the second edge E2 in the y-direction. The angle of the third edge E3 is sufficiently larger than those of the first and second edges E1 and E2.

In the present embodiment, the surface area R is divided into a first surface area R1 sandwiched between the first and third edges E1 and E3 and a second surface area R2 sandwiched between the second and third edges E2 and E3, and the first section S1 of the first wire W1 and the second section S2 of the second wire W2 cross each other on the second surface area R2.

The x-direction edges of the winding core part 23 each have a role of holding the positions of the first and second wires W1 and W2; however, when the first and second wires W1 and W2 are made to cross each other at the edge portion, the second wire W2 is more likely to be displaced, so that the first and second wires W1 and W2 should not be made to cross each other at the edge portion. In the present embodiment, the first and second wires W1 and W2 are made to cross each other on the second surface area R2 positioned between the second and third edges E2 and E3, thereby allowing the winding position of the second wire W2 to be stabilized more.

In addition, the yz cross section of the winding core part 23 has a hexagonal shape, so that the volume of the winding core part 23 is larger than when the winding core part 23 is formed into a rectangular shape. This can enhance magnetic characteristics. Further, forming the winding core part into a hexagonal shape in the yz cross section slightly increase the angles of the respective first and second edges E1 and E2, whereby the bending amounts of the respective first and second wires W1 and W2 at the first and second edges E1 and E2 are relaxed. As a result, adhesion between the winding core part 23 and the first and second wires W1 and W2 can be enhanced.

<Modifications>

Figure 13A:
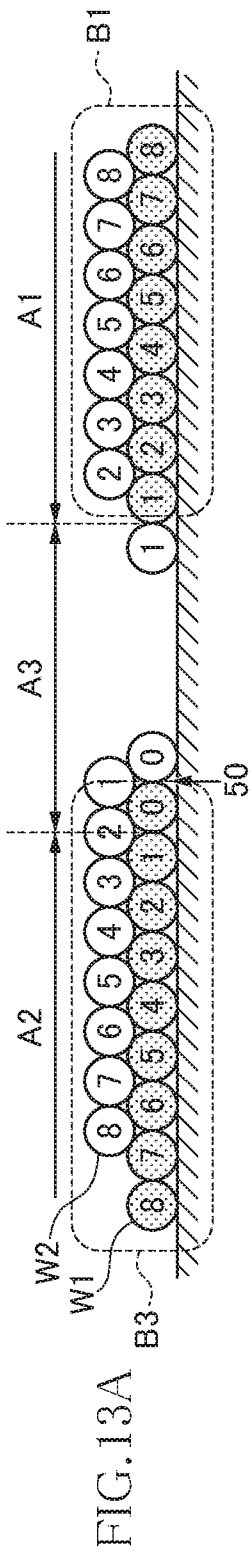
FIGS. 13A to 13C are views for explaining a first modification.
Figure 13B:
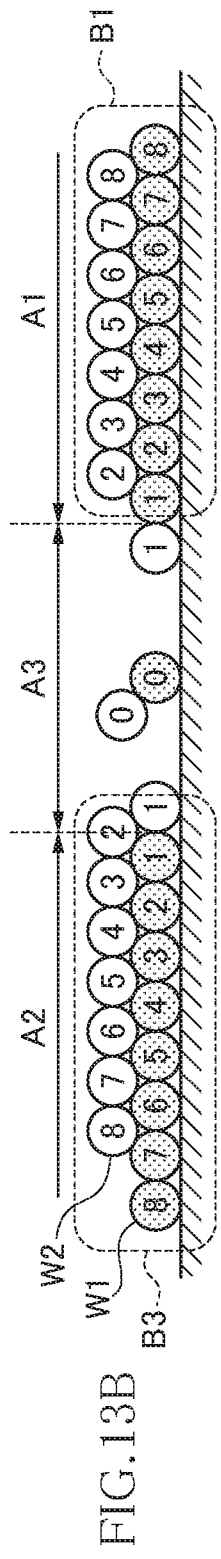
Figure 13C:
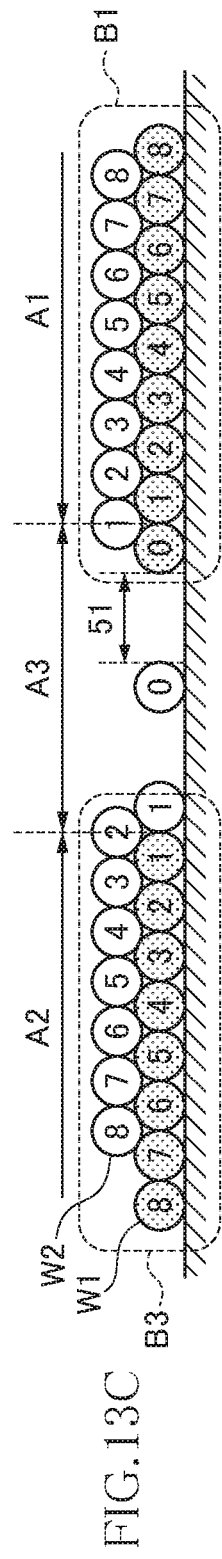

FIGS. 13A to 13C are views for explaining the first modification and correspond respectively to FIGS. 11A to 11C.

In the example of FIGS. 13A to 13C, a first winding block B1 in which the same turns of the first and second wires W1 and W2 are mutually adjacent is formed in the first winding area A1, while in the second winding area A2, a third winding block B3 in which the same turns of the first and second wires W1 and W2 are positioned with different turns thereof interposed therebetween is formed. For example, in the third winding block B3, the turn "2" of the first wire W1 and turn "4" of the second wire W2 are interposed between the turn "3" of the first wire W1 and the turn "3" of the second wire W2. Such a layout can be obtained by disposing the turn "1" of the second wire W2 on the valley line formed by the turn "0" of the first wire W1 and the turn "0" of the second wire W2, as illustrated in FIG. 13A.

In the present modification, the winding layout in the first winding area A1 and that in the second winding area A2 differ from each other, so that a difference occurs in high-frequency characteristics depending on the mounting direction with respect to the mounting substrate 2. By utilizing this, it is possible to provide a common mode filter having two types of high-frequency characteristics.

Figure 14A:
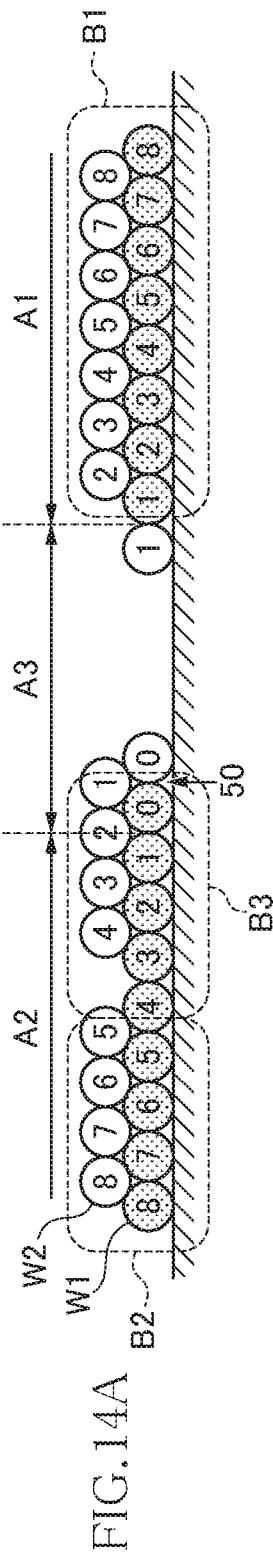
FIGS. 14A to 14C are views for explaining a second modification.
Figure 14B:
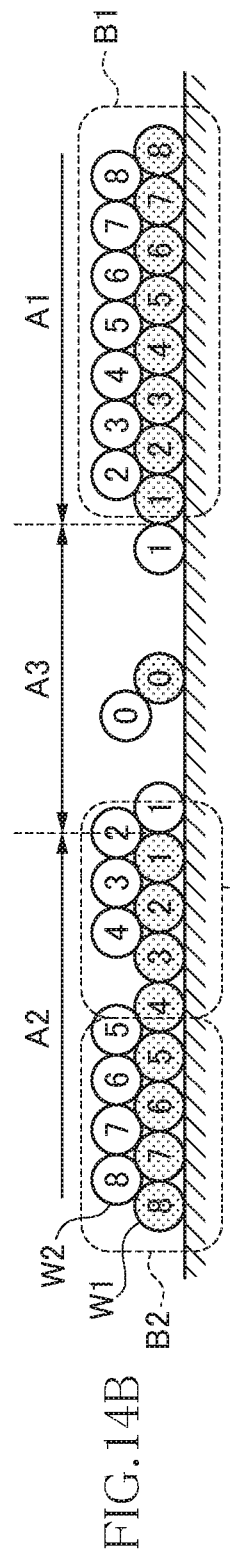
Figure 14C:
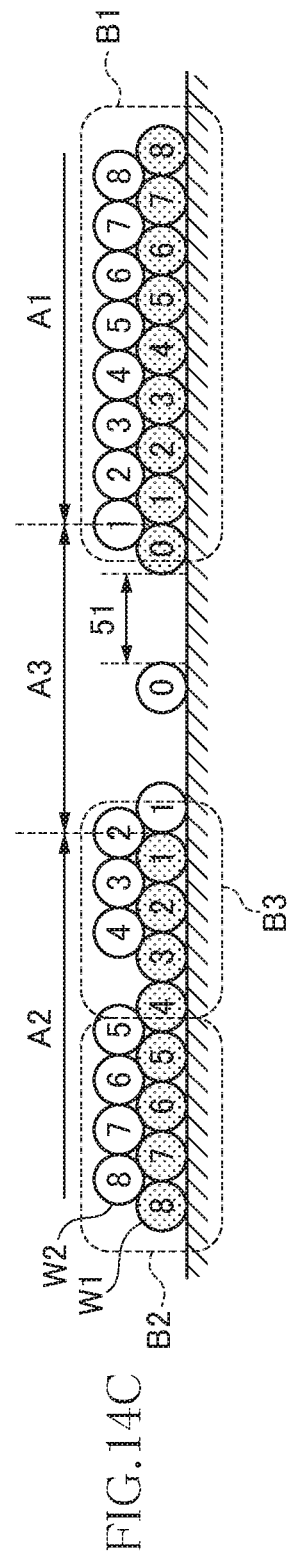

FIGS. 14A to 14C are views for explaining the second modification and correspond respectively to FIGS. 11A to 11C.

In the example of FIGS. 14A to 14C, the first winding block B1 is formed in the first winding area A1, while in the second winding area A2, a second winding block B2 in which the same turns of the first and second wires W1 and W2 are mutually adjacent and the third winding block B3 in which the same turns of the first and second wires W1 and W2 are positioned with different turns thereof interposed therebetween are formed. In the present example, the third winding block B3 is disposed between the first and second winding blocks B1 and B2.

As illustrated in FIGS. 14A to 14C, a space corresponding to one pitch is provided between the second wire W2 (turn "5") constituting the second winding block B2 and the second wire W2 (turn "4") constituting the third winding block B3. That is, the second wire W2 is wound with one pitch skipped on the way from the third winding block B3 to the second winding block B2 during winding work.

In the present modification, a common mode filter having two types of high-frequency characteristics can be provided as in the first modification. Further, the winding range of the wire constituting the third winding block B3 is smaller than that in the first modification, so that it is possible to suppress symmetry between differential signals from being broken.

FIGS. 15A to 15C are views for explaining the third modification and correspond respectively to FIGS. 11A to 11C.

In the example of FIGS. 15A to 15C, the first winding block B1 and a fourth winding block B4 are formed in the first winding area A1, while in the second winding area A2, the second and third winding blocks B2 and B3 are formed. In the fourth winding block B4, the same turns of the first and second wires W1 and W2 are mutually adjacent as in the first winding block B1. However, in the first winding block B1, the first wire W1 of the pair of wires (first and second wires W1 and W2) constituting the same turn is positioned on the crossing side (third winding area A3 side), while in the fourth winding block B4, the second wire W2 of the pair pf wires (first and second wires W1 and W2) constituting the same turn is positioned on the crossing side.

As illustrated in FIGS. 15A to 15C, a space corresponding to one pitch is provided between the second wire W2 constituting the first winding block B1 and the second wire W2 constituting the fourth winding block B4. That is, the second wire W2 is wound with one pitch skipped on the way from the first winding block B1 to the fourth winding block B4 during winding work.

In the present modification, a common mode filter having two types of high-frequency characteristics can be provided as in the first modification. Further, the second wire W2 is wound with one pitch skipped both in the first and second winding areas A1 and A2, the symmetry can be enhanced.

FIGS. 16A to 16C are views for explaining the fourth modification and correspond respectively to FIGS. 11A to 11C.

In the example of FIGS. 16A to 16C, the first winding block B1 is formed in the first winding area A1, while in the second winding area A2, the third winding block B3 and a fifth winding block B5 are formed. In the fifth winding block B5, the same turns of the first and second wires W1 and W2 are mutually adjacent as in the second winding block B2. However, in the second winding block B2, the second wire W2 of the pair of wires (first and second wires W1 and W2) constituting the same turn is positioned on the crossing side, while in the fifth winding block B5, the first wire W1 of the pair of wires (first and second wires W1 and W2) constituting the same turn is positioned on the crossing side.

As illustrated in FIGS. 16A to 16C, a space corresponding to two pitches is provided between the second wire W2 constituting the third winding block B3 and the second wire W2 constituting the fifth winding block B5. That is, the second wire W2 is wound with two pitches skipped on the way from the third winding block B3 to the fifth winding block B5 during winding work.

In the present modification, a common mode filter having two types of high-frequency characteristics can be provided as in the first modification. Further, the second wire W2 is wound with two pitches skipped in the second winding area A2, so that it is possible to increase a difference in high-frequency characteristics depending on the mounting direction with respect to the mounting substrate 2.

Figures 17A, 17B, 17C:
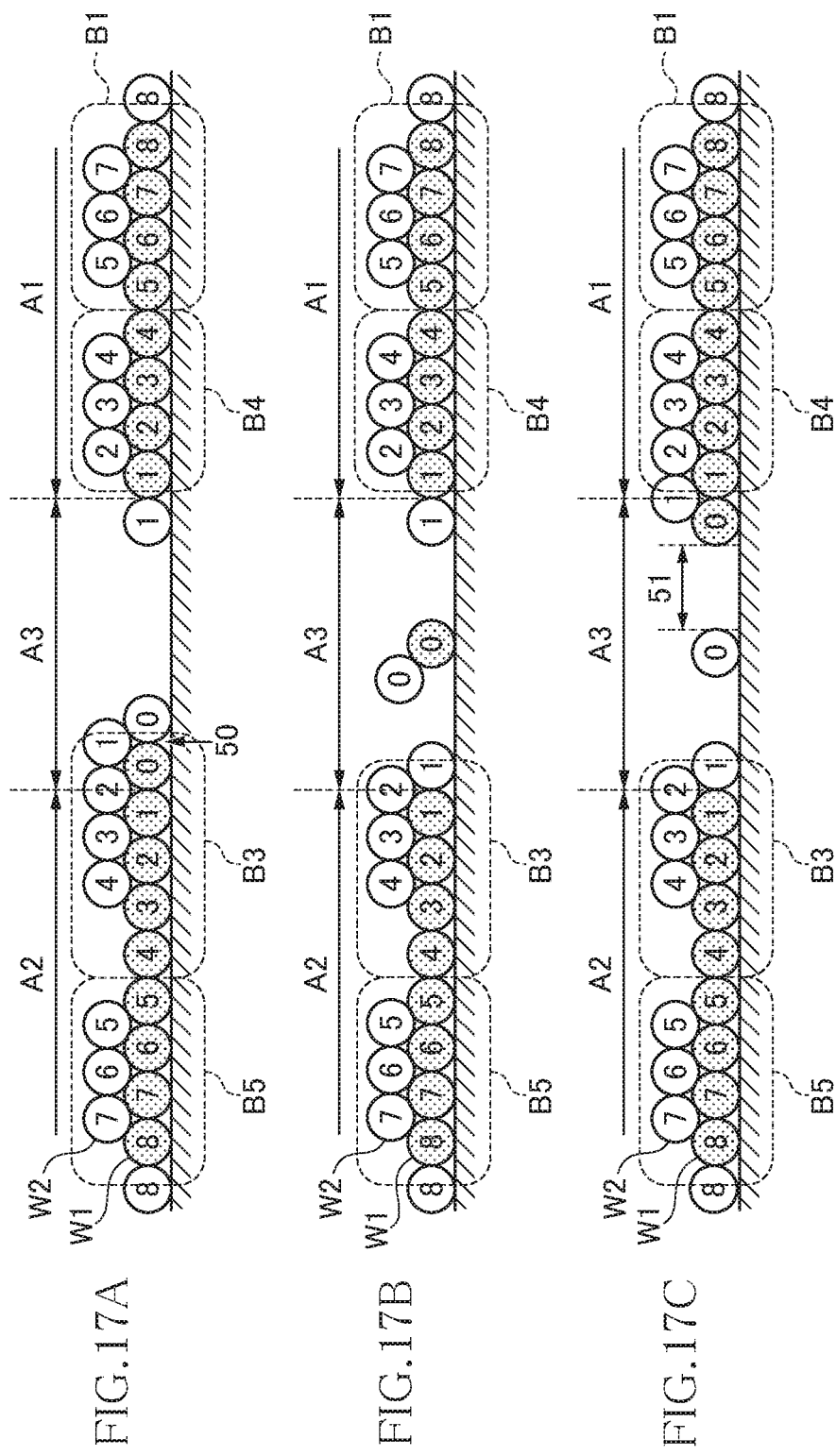
FIGS. 17A to 17C are views for explaining a fifth modification.

FIGS. 17A to 17C are views for explaining the fifth modification and correspond respectively to FIGS. 11A to 11C.

In the example of FIGS. 17A to 17C, the first and fourth winding blocks B1 and B4 are formed in the first winding area A1, while in the second winding area A2, the third and fifth winding blocks B3 and B5 are formed. As illustrated in FIGS. 17A to 17C, the second wire W2 is wound with one pitch skipped on the way from the first winding block B1 to the fourth winding block B4 during winding work, and the second wire W2 is wound with two pitches skipped on the way from the third winding block B3 to the fifth winding block B5.

In the present modification, a common mode filter having two types of high-frequency characteristics can be provided as in the first modification. As exemplified in the present modification, the skip amount (one pitch) of the second wire W2 in the first winding area A1 and the skip amount (two pitches) of the second wire W2 in the second winding area A2 may differ from each other.

It is apparent that the present invention is not limited to the above embodiments, but may be modified and changed without departing from the scope and spirit of the invention.

What is claimed is:

1. A common mode filter comprising:
   a winding core part including a first winding area positioned at one end side in an axial direction, a second winding area positioned at other end side in the axial direction, and a third winding area positioned between the first and second winding areas; and
   first and second wires wound in a same direction around the winding core part,
   wherein the first wire is aligned and wound in the first and second winding areas,
   wherein the second wire is wound on the first wire in the first and second winding areas, and
   wherein a first predetermined turn of the first wire and a second predetermined turn of the second wire that are a same turn of the first predetermined turn of the first wire cross each other in the third winding area and are separated at least partially in the third winding area,
   wherein the third winding area has first and second edges extend in the axial direction and a surface area positioned between the first and second edges, the surface area including first and second surface areas different in a circumferential position from each other,
   wherein the first predetermined turn of first wire includes a first section is positioned on the surface area, the first section including first and second sub-sections being different in the circumferential position from each other, the first and second sub-sections being positioned on the first and second surface areas, respectively,
   wherein the second predetermined turn of second wire includes a second section positioned on the surface area, the second section including third and fourth sub-sections different in the circumferential position from each other, the third and fourth sub-sections being positioned on the first and second surface areas, respectively,
   wherein the first sub-section and the third sub-section are separated without being in contact with each other, and
   wherein the second sub-section and the fourth sub-section cross each other on the second surface area.

2. The common mode filter as claimed in claim 1,
   wherein the first sub-section and the third sub-section are separated from each other at least on one of the first and second edges.

3. The common mode filter as claimed in claim 2,
   wherein the first sub-section and the third sub-section are separated from each other on the first edge, and
   wherein the second sub-section and the fourth sub-section contact each other on the second edge.

4. The common mode filter as claimed in claim 3,
   wherein the surface area has a third edge extending in the axial direction, and
   wherein a distance between the first and third edges is substantially a same as a distance between the second and third edges.

5. The common mode filter as claimed in claim 4,
   wherein the first surface area is positioned between the second and third edges, and
   wherein the second surface area is positioned between the second and third edges.

6. The common mode filter as claimed in claim 1, further comprising:
   a first flange part provided at the one end of the winding core part in the axial direction and having a mounting surface and a top surface which extend in parallel to the axial direction;
   a second flange part provided at the other end of the winding core part in the axial direction and having a mounting surface and a top surface which extend in parallel to the axial direction;
   first and second terminal electrodes provided on the mounting surface of the first flange part and connected with one ends of the respective first and second wires; and
   third and fourth terminal electrodes provided on the mounting surface of the second flange part and connected with other ends of the respective first and second wires,
   wherein the surface area faces in substantially a same direction as the mounting surface, and
   wherein the winding core part is formed at a position closer to the top surface side than to the mounting surface side.

7. The common mode filter as claimed in claim 1, wherein the first and second wires constitute a first winding block in which same turns thereof are mutually adjacent in the first winding area.

8. The common mode filter as claimed in claim 7, wherein the first and second wires further constitute a second winding block in which same turns thereof are mutually adjacent in the second winding area.

9. The common mode filter as claimed in claim 8, wherein the first and second wires further constitute a third winding block in which same turns thereof are positioned with different turns thereof interposed therebetween in the second winding area.

10. The common mode filter as claimed in claim 9, wherein the third winding block is positioned between the first and second winding blocks.

11. The common mode filter as claimed in claim 8, wherein the second predetermined turn of the second wire is adjacent to each of the first and second winding blocks without an interposition of the first wire.

12. The common mode filter as claimed in claim 1, wherein the second predetermined turn of the second wire is adjacent to a previous turn of the second predetermined turn without an interposition of the first wire and is adjacent to a next turn of the second predetermined turn without an interposition of the first wire.

* * * * *